Figure 1:
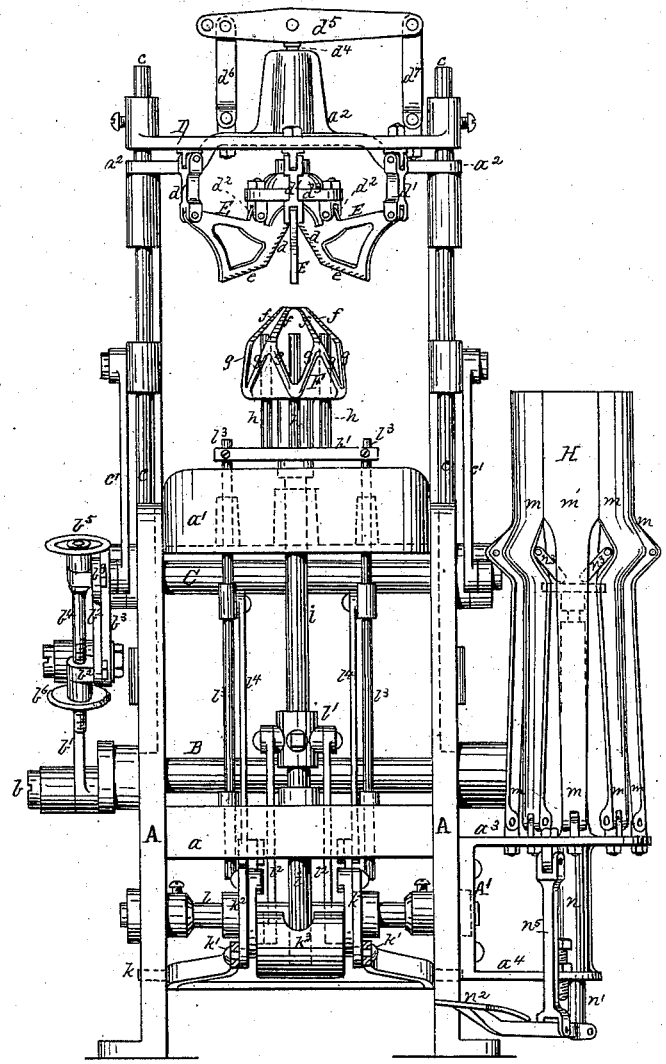

3 Sheets—Sheet 1.

R. EICKEMEYER.
Process and Machine for Stretching Hats.

No. 198,876. Patented Jan. 1, 1878.

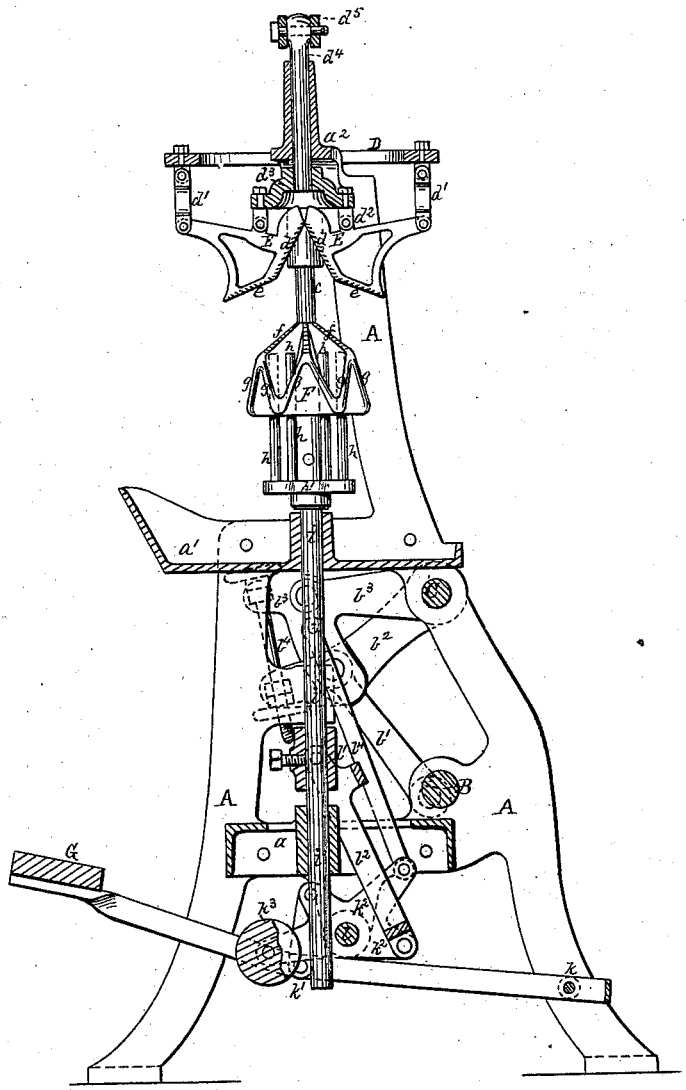

3 Sheets—Sheet 3.
R. EICKEMEYER.
Process and Machine for Stretching Hats.
No. 198,876. Patented Jan. 1, 1878.
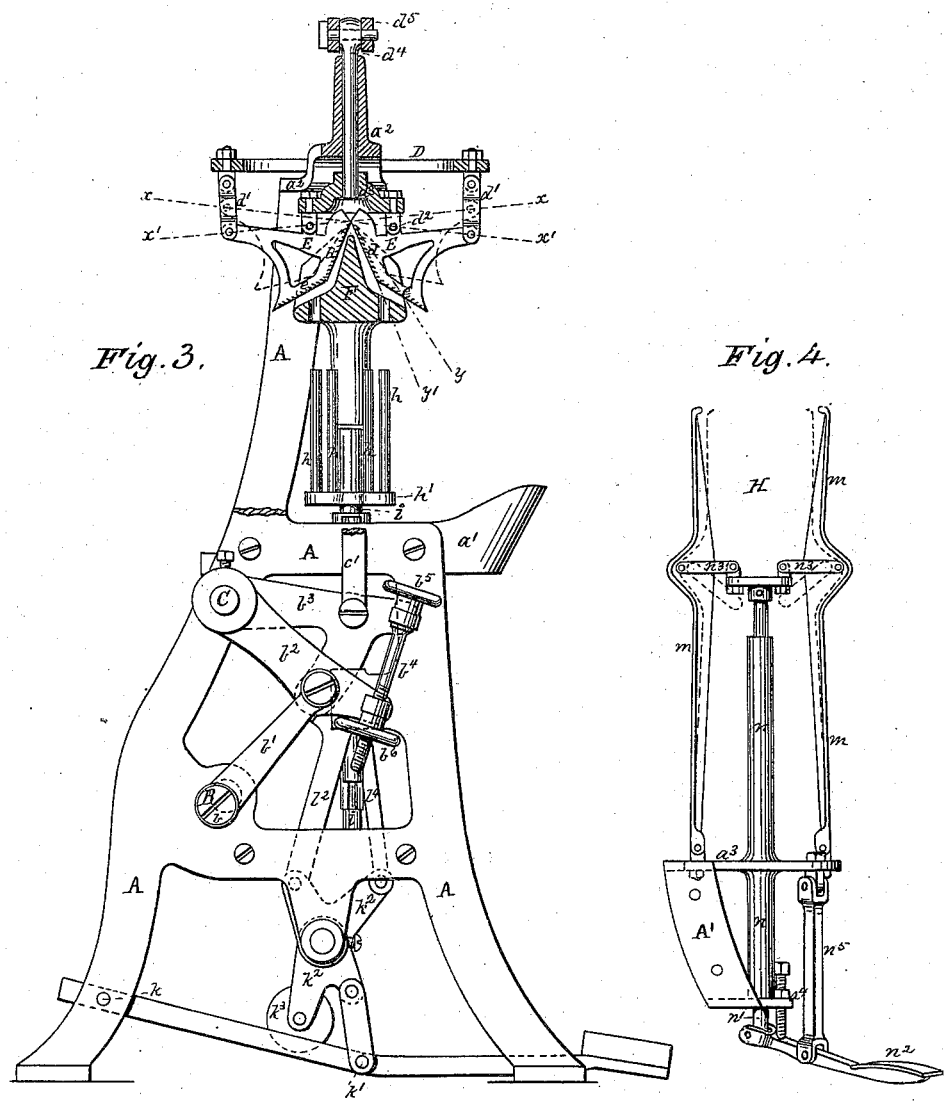

UNITED STATES PATENT OFFICE.

RUDOLF EICKEMEYER, OF YONKERS, NEW YORK.

IMPROVEMENT IN PROCESSES AND MACHINES FOR STRETCHING HATS.

Specification forming part of Letters Patent No. 198,876, dated January 1, 1878; application filed December 11, 1877.

*To all whom it may concern:*

Be it known that I, RUDOLF EICKEMEYER, of Yonkers, in the county of Westchester and State of New York, have invented certain new and useful Improvements in the Process of Hat-Stretching and in Machines for Stretching Hats; and I do hereby declare that the following specification, taken in connection with the drawings furnished and forming a part of the same, is a true, clear, and complete description of my invention, and of a machine embodying the several mechanical features thereof.

My said improvement in the process of hat-stretching relates particularly to that class of felt hats which are stretched before being dyed; and it has special value in connection with hats which are stretched in machines which operate on the corrugation principle.

Hats, when stretched by corrugation, are, when they leave the stretchers, more or less wrinkled or corrugated, and in that condition they have heretofore been subjected to the hot dye-bath, which necessarily hardens the felt, and so sets the wrinkles or corrugations that much time, labor, and expense are requisite for their removal by subsequent mechanical operations; and my said improvement in the process consists in stretching an undyed felt hat on a corrugating-machine, and, while the hat is still warm, soft, and pliable, subjecting it to the action of a peripherical "shaper," whereby the wrinkles are removed, after which said hats are ready for the dye-bath.

This improvement in the process of stretching hats results not only in great practical economy in hat-making, but the hats produced in accordance therewith are capable of an evener finish than hats treated as heretofore.

Any form of corrugating stretching-machine and any form of peripherical shaper may be employed; but I herein show a novel machine embodying both capacities, and this may be successfully used in the application of my process improvement.

My present improvements in stretching-machines relate to that class which operate on the corrugation principle. Numerous Letters Patent have heretofore been issued to me for various improvements in this class of machines, some of which are hereinafter specified for indicating the prior state of the art, and for pointing out more fully the several features of my present invention, and their capability of application, in more or less detached portions, to pre-existing machines.

So far as my knowledge extends, the machine herein described is the first operating on the corrugation principle which is capable of simultaneously stretching the tip and side crown of a hat, as well as the first which embodies a shaper for removing the wrinkles from undyed hat-bodies.

In Letters Patent No. 91,730, dated June 12, 1869, I show a corrugation-machine in which the tip and brim may be stretched, and in Letters Patent No. 140,903, July 15, 1873, No. 162,540, April 27, 1875, No. 167,391, September 7, 1875, and No. 168,731, October 11, 1875, I describe improvements in corrugation-machines whereby the tips only can be stretched. In my Letters Patent No. 175,953, April 11, 1876, I show a machine which stretches the brims of hats on the corrugation principle, and, in part, by means of brim-stretching fingers which are individually rapidly vibrated. As I believe, this last-named machine is the first, prior to my present machine, in which stretching-fingers of any kind have each this vibrating capacity, although in some of my prior machines the stretching-fingers, considered as a whole, have been vertically reciprocated to and from a "former" which supports the hat-body.

The first feature of the mechanical portion of my present invention consists in a machine embodying a suitable former and radial stretching-fingers, the same constituting corrugating hat-stretching mechanism, and an expansive shaper, which operates peripherically on the hat-body for removing the wrinkles incident to the stretching operation, whereby both the stretching and shaping may be promptly and easily executed by the same operative without materially changing his position, and while the hat is in a soft and pliable condition. This shaper may be like any of the expansive hat-blocks heretofore used in "blocking;" but I prefer one constructed substantially as hereinafter described, which contains novelties in construction, as specified and claimed.

Another feature of my invention consists in the combination, with a suitable former for supporting the hat-body, of a series of radial stretching-fingers, each having two working-faces, for simultaneously developing the tip and side crown, respectively, and each being vibrated, so that their several faces reciprocate to and from a hat-body when supported by the former.

A suitable former must, as heretofore, have the capacity of being depressed to receive a hat, and also to be elevated at the will of the operative into working relation with the fingers, and for effective service I provide it, in a novel manner, with such ribs as will co-operate, respectively, with the tip-faces and the side-crown faces of the fingers; and, in this connection, my invention further consists in a former provided with tip-ribs, which are inclined downward and outward from the center or top of the former, and side-crown ribs, which incline downward from the lower end of each tip-rib toward each other, and unite so as to present V-shaped recesses below and between the tip-ribs. The former should also have a "clearer" or "stripper," for convenience in operation for freeing it from a stretched hat-body, and, although a spring-clearer is shown in my Letters Patent No. 162,540, April 27, 1875, I prefer to employ vertical clearing-rods, which, when the former is depressed, extend through holes therein and lift the hat-body; and this construction constitutes another feature of my invention. This novel clearer is also operated in a novel manner by means of the treadle, which simultaneously imparts to the former a downward movement and to the clearer an upward movement; and such a combination of the three parts constitutes another feature of my invention.

Radial stretching-fingers having a tip-face and a side-crown face are novelties in stretching-machines, and these constitute a portion of my invention, and they can be used in prior machines, either fixed in their position or, as a whole, arranged to vertically reciprocate without individual vibration.

Radial tip-stretching fingers have never heretofore been capable of individual vibration, and these can be successfully used in connection with formers as heretofore constructed; and my invention further consists, for stretching the tips only, in a series of radial tip-stretching fingers, in combination with mechanism for vibrating each finger. Stretching-fingers, arranged in combination with a former for stretching a side crown, are also novel. This combination constitutes another portion of my invention.

In machines, as heretofore constructed, for stretching tips of hats the strain on the tip is from the center outward in radial lines, because the hat is forced upward into contact with the stretching-fingers, resulting in a slip between the fingers and hat, and therefore the tip is liable to injury by cutting or abrasion, or bursting near the center, at the apex of the former. This is particularly the case with stationary fingers, and partially so with those which, as a whole, are vertically reciprocated, because the strain in both cases is from the center outward toward the "square" of the hat, although somewhat less dangerous with the reciprocating than with the stationary fingers.

For enabling the stretching-fingers to rapidly and effectually operate in stretching the tip and side crown, and without liability of injury to the hat-body, I have so mounted the stretching-fingers that as they vibrate they also have a movement upward, so that whatever frictional slip may occur between the fingers and the hat-body will be in a direction toward the center of the tip instead of outward, as heretofore; and, in this connection, my invention consists in a series of vibrating stretching-fingers, which are pivoted centrally, so that when their outer ends are moved up and down the inner ends or working-faces will be similarly moved more or less longitudinally to lesser degree.

With the fingers thus mounted, they should be provided with smooth working-faces; but for rapid service I prefer rounded and laterally-serrated faces, and these should be operated with a minimum of slip, or none whatever in some cases, and this is attained by pivoting the fingers to a supporting plate or head, which is vertically reciprocated simultaneously with the outer ends of the fingers, but at a slower speed and to a lesser extent; and, in this connection, my invention further consists in a series of vibrating stretching-fingers pivoted to and supported by a vertically-reciprocating head.

This form of mounting is desirable even if the working-faces of the fingers be smooth, and, inasmuch as tip-stretching fingers have never before been laterally serrated, they constitute, in proper combination, another feature of my present invention, notwithstanding the fact that I show brim-stretching fingers which have serrated faces in my Letters Patent dated April 11, 1876.

There are certain other novel features of a minor character, which will be hereinafter specified in connection with the detailed description with reference to the accompanying drawings, of which there are three sheets.

Figure 1, Sheet 1, represents, in front elevation, a complete machine embodying the several mechanical features of my invention. Fig. 2, Sheet 2, represents the same in central vertical section on a line extending from front to rear. Fig. 3, Sheet 3, represents the same, partly in side view and partially in central vertical section, as in Fig. 2, but with the former in an elevated position. Fig. 4, Sheet 3, represents, in central vertical section, the shaper detached from the machine.

The main frame A is composed of two duplicate side plates, a cross-plate, $a$, near the bottom, a central pan-shaped plate, $a^1$, (for holding the water which drips from the hats when in proper condition for stretching,) and a top plate, $a^2$, which unites the two side plates. The auxiliary frame A' for supporting the shaper is bolted to the outer side of one of the side plates at its front edge, and has an upper bracket, $a^3$, circular in form, and a lower bracket, $a^4$, all of which will be again hereinafter referred to.

B denotes the driving-shaft, provided with fast and loose pulleys for belt-connection with suitable shafting. At one end of the shaft is a crank, $b$, and this is connected with the rock-shaft C by means of the rod $b^1$, pivoted loosely to arm $b^2$, which is, in turn, loosely mounted on the rock-shaft, and lever $b^3$ keyed to the shaft, and connected with the outer end of arm $b^2$ by an adjusting-screw, $b^4$, which is mounted at the upper end in a collar, and is tapped at its lower end into a lug on the arm $b^2$. This screw is provided at its upper end with a hand-wheel, $b^5$, for rotating it, and at its lower end with a wheel-nut, $b^6$, for setting the screw after adjustment. This combination of parts for thus modifying the action of the rock-shaft, in connection with the stretching-fingers, constitutes one portion of my invention.

D denotes a vertically-reciprocating annular finger-plate, which derives its motion from the rock-shaft C through vertical sliding rods $c$ on each side of the machine, and links $c^1$, one of which is pivoted to lever $b^3$, and the other to an arm at the opposite end of the rock-shaft.

E in each instance denotes a stretching-finger, which is provided with two laterally-serrated working-faces, $d$ and $e$. The inner or tip face $d$ operates on the tip of a hat-body, and the outer or side-crown face $e$ operates on the side crown. The length of the inner or tip face should be about one-half the diameter of a hat of average size, and the length of the outer or side-crown face may be somewhat longer than the first. The angles of the faces to each other should be substantially as shown in the drawings. Each finger is provided with a fulcrum-pivot at $d^2$ in the end of a bolt, which is secured by a nut to a circular finger-head, $d^3$, provided with a spindle, $d^4$, which extends upward through a long bearing in the top plate $a^2$, and is connected to and supported by a lever, $d^5$, which has its fulcrum on a pivoted bar, $d^6$, resting on the top plate, and connected at its opposite end by link $d^7$ with the finger-plate D. Each finger at its outer end is connected to finger-plate D by means of links $d^1$ and eyebolts.

With the description thus far it will be seen that the rotation of the main shaft will cause each finger to vibrate toward and from a common center, but that the working-faces will have no longitudinal movement if the finger-head $d^3$ be vertically reciprocated to an extent and at a rate of speed which is less than the movement of the finger-plate D, this being determined with reference to difference in distance from the inner end of the finger to the fulcrum-pivot, and to the link-connection at the outer end of the finger. On the other hand, if the finger-head $d^3$ be not vertically reciprocated, there will be a decided longitudinal movement of the working-faces, or if the lever $d^5$ have a variable fulcrum-pin, as shown, the extent and character of movement of the finger-head may be varied, with a corresponding variation in the longitudinal movement of the working-faces of the fingers. It will also be seen that the working-faces on the fingers may be brought nearer together by so turning the adjusting-screw as to turn the rock-shaft C and depress the side rods without varying their range of movement, although thereby varying their stretching capacity.

F denotes the novel former. As heretofore, it is radially ribbed; but it differs from any previously known to me in that it has two sets or series of ribs for developing both the tip and the side crown of a hat by simultaneous stretching operations. The tip-ribs are shown at $f$, and, as heretofore, they extend downward and outward radially from the apex of the former, and are laterally serrated. These ribs co-operate with the tip-faces $d$ on the stretching-fingers E. The side-crown ribs $g$ extend downward and slightly outward from the outer and lower end of each tip-rib, and, being in pairs, they approach and form junctions with each other at their lower ends. These side-crown ribs co-operate with the side-crown faces $e$ on the stretching-fingers E.

The former is mounted on a vertically-sliding spindle, $i$, and actuated by a treadle, G, substantially in the same manner as is shown and described in my Letters Patent No. 175,953, dated April 11, 1876. The treadle G has two side pieces, which are pivoted at their rear ends to the lateral rod or shaft at $k$, and each side piece is linked at $k^1$, near its center, to one arm on each of the two parallel duplicate four-armed levers, $k^2$, mounted on a lateral rock-shaft, $l$. The spindle $i$ has a lateral cross-head at $l^1$, which is connected with the rock-shaft levers $k^2$ by two rods, $l^2$.

To counterbalance the weight of the spindle and the parts connected therewith, a weight, $k^3$, is attached to the front ends or arms of levers $k^2$, and located between them.

Instead of using a spring clearer or stripper for lifting the stretched hat-body from the ribbed former, as shown in my Letters Patent 162,540, April 27, 1875, I prefer to use in this machine a series of clearer-rods which are positively operated by the treadle.

Each space between the ribs of the former is provided with a vertical aperture for the reception of the clearer-rods $h$, which are mounted at regular intervals on a cross-head, $h'$, and arranged in a circle around the spindle $i$, which is within a central open space in the cross-head.

The clearer-rods, when the treadle is fully elevated and the former depressed, extend their upper ends above the surface of the former, and thereby lift a hat therefrom, so that the operative may readily remove the hat or turn it so that other surfaces thereof may be subjected to the action of the stretching-fingers. As the treadle is depressed and the former elevated, the clearer-rods move upward for a short distance, then stop, and then move downward as the former continues upward, and as the former is lowered the clearer-rods are elevated. This motion of the clearer is imparted by means of two sliding rods, $l^3$, connected with the treadle by two links, $l^4$, pivoted to said rods and to the upper arms of levers $k^2$. These upper arms, in passing from the position shown in Fig. 2 to that shown in Fig. 3, effect the peculiar movement of the clearer-rods described, as will be clearly understood.

As previously stated, one portion of my present invention consists, broadly, in a machine embodying corrugating hat-stretching devices and a shaper which operates peripherically in removing the wrinkles incident to stretching by corrugation. I do not limit myself, in this connection, to the particular stretching devices herein shown, nor to the particular shaper shown in the drawings and hereinafter described, as I am well aware that expansible hat-blocks have long been made for finishing hats and developing particular sizes; and that I can use well-known expansible blocks in the place of the shaper herein shown. It is, however, to be distinctly understood that the service performed by said blocks, as shapers, in removing the wrinkles incident to stretching as herein employed is wholly distinct from the blocking operation, and that hats, after having been subjected to the shaper and then dyed, must be thereafter blocked, as heretofore, as one of the essential subsequent finishing operations. I have shown the shaper herein as attached to the stretching-machine, but operated by a separate treadle, so that the operative, without moving from his position, may remove a hat from the stretcher and immediately place it on the shaper and remove the wrinkles.

I am well aware that I could place the shaper in the center of the stretching-machine, and have the former so arranged that it would drop within the shaper and leave the hat thereon, and that the shaper so located could be expanded by a lever or treadle, or by power from the driving-shaft; but this construction would involve expensive complexity without fully corresponding advantages, and therefore it is preferable to employ the simple and comparatively inexpensive shaper as a separate organization of mechanism, but so located with reference to the stretching-machine that a stretched hat, while still warm and pliable, may be promply freed from wrinkles.

The shaper H is mounted on the auxiliary frame A'. It consists of numerous vertical levers, $m$, which are arranged in a circle, and have the outer surfaces of their upper ends slightly curved laterally, so that each constitutes in lateral section the segment of a drum of proper diameter to receive a hat-body. The lower ends of these levers $m$ are hinged to the upper circular plate $a^3$, which is a part of the auxiliary frame. This frame also supports a central tubular post, $n$, within which is a vertically-sliding spindle, $n^1$, connected at the bottom with the inner end of a treadle-lever, $n^2$. This treadle, when depressed, elevates the spindle, and that movement expands the levers $m$ by means of links $n^3$, which are pivoted to a circular plate on the top of the spindle. The upward throw of the spindle, and the consequent expansion of the shaper, is limited, as occasion may require, by the stop-screw $n^4$. The treadle-lever has a shifting fulcrum at the end of a pendent link, $n^5$, which secures an easy movement of the spindle within the tubular post. A spring may be employed for depressing the spindle; but its weight is usually sufficient for that purpose, which thereby maintains the shaper normally in a contracted condition, and ready to receive a hat.

In operating the stretcher when adjusted as shown in the drawings, the inner ends of the stretching-fingers maintain a nearly constant position, as is clearly indicated in Fig. 3 by the dotted lines. The line at $x$ indicates the highest position of their pivotal connections, and that at $x'$ indicates their lowest position. The extremes of position assumed by the tip-faces $d$ are indicated by the dotted lines $y$ and $y'$, the former denoting the outer position, the latter the inner position, assumed in their vibrations.

In stretching hats the operation of this machine is as follows: The main shaft is run at a speed of from four hundred to four hundred and twenty-five revolutions per minute, causing the fingers to correspondingly vibrate toward and from a common center. A well steamed or soaked hat-body is placed on the former, the treadle depressed until the hat is in contact with the fingers. After ten or fifteen vibrations of the fingers the former is lowered far enough to permit of the partial rotation of the hat, (the clearer-rods meantime having freed it from the former,) in order that other surfaces may be presented to the fingers by again elevating the former, and this is repeated until the side crown and tip have been fully developed.

With this machine I have been enabled to properly stretch in a given time from three to four times as many hat-bodies as can be stretched in the same time with any prior machine known to me. Hats stretched on this machine are less liable to be injured in stretching, and they are much nearer the shape required for proper finishing than can be attained with any stretching-machine heretofore in use. This rapidity in its execution has a value beyond that incident to mere numbers when it is used on what are termed "stiff"

hats, because such hats have light bodies filled with shellac or equivalent "stiff;" and heretofore great difficulty has always been experienced in stretching and blocking them, on account of the rapid setting of the shellac by cooling during the operation. With this machine this difficulty is practically obviated, because of its great rapidity in execution.

When operating on undyed hat-bodies, they are promptly transferred, while still hot and pliable, from the former to the shaper, and with a few strokes of the treadle all vestiges of wrinkles are removed. If, as heretofore, such hats were dyed after coming from the stretcher, the wrinkles would be so fixedly set by the shrinkage of the felt in the hot bath that from ten to twenty times more time and labor than that incident to using the shaper would be requisite, without even then attaining as good a finish as when the shaper is employed.

It is clearly obvious that many of the separable improvements hereinbefore described may be profitably employed in other combinations in other machines; and although it will be impracticable for me herein to point out all of the various applications of which I am fully aware, I will specify a few by way of illustration—as, for instance, my novel stretching-fingers, wholly immovable, may be used with my novel former in a foot-power machine like that shown in Letters Patent Nos. 140,903, 162,540, and 168,731; also in machines like that shown in Patent 167,391, in which the stretching-fingers as a whole have a vertical reciprocating movement; but in these cases it would be preferable to use smooth instead of serrated faces and a former, as heretofore. The tips and side crowns could with such machines be simultaneously stretched, although not so rapidly as with my present machine; or rapidly-reciprocating tip-stretching fingers, as herein described, may be used with a former having tip-ribs only, and thereby expedite the stretching of tips beyond the capacity of any pre-existing machine.

For these reasons I do not confine myself to the particular combinations herein shown, but also make specific claim to many of the novel devices.

Having thus described my invention, I claim as new and desire to secure by Letters Patent—

1. The improvement in the process of stretching undyed felt hats, which consists in subjecting them to the action of corrugating stretching devices, and then subjecting them, while still hot and pliable, to a shaper, which, by peripherical expansion, removes the wrinkles or corrugations, substantially as described.

2. A machine embodying a series of radial stretching-fingers, and a suitable former for stretching hats on the corrugation principle, and an expansible shaper, which removes the wrinkles or corrugations by peripherical expansion, substantially as described.

3. The combination, with a suitable former for supporting a hat-body, of a series of radial stretching-fingers, each of which is provided with a tip-face and a side-crown face, and is vibrated toward and from a common center.

4. In a hat-stretching machine provided with a series of radial stretching-fingers, a former for supporting a hat-body, which is provided with a series of tip-stretching ribs, and a series of ribs for stretching the side crown of a hat-body, substantially as described.

5. In a hat-stretching machine, radial stretching-fingers provided with two working-faces, for operating, respectively, upon the tip and the side crown of a hat-body, substantially as described.

6. In a hat-stretching machine, a series of radial tip-stretching fingers, which are individually vibrated toward and from a common center, substantially as described.

7. In a hat-stretching machine, a series of fingers for stretching a side crown, which are individually vibrated toward and from a common center, in combination with a ribbed former, substantially as described.

8. A tip-ribbed former, in combination with vibrating tip-stretching fingers, the working-faces of which, when vibrated, have a more or less longitudinal movement toward the apex of the former, substantially as described.

9. A series of vibrating tip-stretching fingers, provided with rounded and serrated working-faces, in combination with a vertically-reciprocating head, which supports the fingers, substantially as described.

10. A series of vibrating tip-stretching fingers, which are attached to and supported by a vertically-reciprocating head, substantially as described.

11. The combination, with a series of individually-vibrated stretching-fingers, of adjusting mechanism, which varies the working position of the fingers with relation to a common center, substantially as described.

12. The combination, with a series of vibrating and vertically-reciprocating stretching-fingers, of adjusting mechanism for varying the extent of the vertical movement, substantially as described.

13. The combination, with a series of vibrating and vertically-reciprocating stretching-fingers, of adjusting mechanism for varying the position of the fingers with relation to a common center, and adjusting mechanism for varying the extent of the vertical movement, substantially as described.

14. A series of radial vibrating stretching-fingers, provided with faces for operating on the tip and the side crown of a hat-body, in combination with a former provided with tip-ribs and side-crown ribs, and mechanism for placing the former and the stretching-fingers into working relations, substantially as described.

15. The combination, with a former, of a series of clearing-rods, which extend through the former when it is depressed, substantially as described.

16. The combination of a former, and a treadle for lifting and depressing it, with a clearer, which is connected to the treadle, and is lifted by it when the former is depressed, substantially as described.

17. The combination, in a shaper, of a series of vertical levers, arranged in a circle, with a circular plate connected with the levers by links, a sliding spindle connected with said plate, and a treadle supported by a link, which is connected with the spindle, and limited in its movement by an adjusting-screw, substantially as described.

RUDOLF EICKEMEYER.

Witnesses:
G. OSTERHELD,
GEORGE NARR.